United States Patent
Huh et al.

(10) Patent No.: US 9,981,554 B2
(45) Date of Patent: May 29, 2018

(54) SYSTEM AND METHOD FOR CONTROLLING BRAKING OF ELECTRIC VEHICLE

(71) Applicants: Hyundai Motor Company, Seoul (KR); Kia Motors Corporation, Seoul (KR)

(72) Inventors: Jee Wook Huh, Whasung-Si (KR); Teh Hwan Cho, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 14/825,997

(22) Filed: Aug. 13, 2015

(65) Prior Publication Data

US 2016/0244034 A1   Aug. 25, 2016

(30) Foreign Application Priority Data

Feb. 25, 2015   (KR) ........................ 10-2015-0026712

(51) Int. Cl.
*B60K 31/02* (2006.01)
*B60T 1/10* (2006.01)
*B60T 7/04* (2006.01)
*B60T 13/58* (2006.01)

(52) U.S. Cl.
CPC ................ *B60K 31/02* (2013.01); *B60T 1/10* (2013.01); *B60T 7/042* (2013.01); *B60T 13/586* (2013.01); *B60T 2201/02* (2013.01); *B60T 2270/604* (2013.01)

(58) Field of Classification Search
CPC .. B60T 7/12; B60T 1/10; B60T 13/586; B60T 7/042; B60T 2270/604; B60T 2201/02; B60K 31/02
See application file for complete search history.

(56) References Cited

U.S. PATENT DOCUMENTS

2014/0288798 A1*   9/2014   Ando .................... B60W 30/14
                                                                 701/93

FOREIGN PATENT DOCUMENTS

| JP | 9-123883 A | 5/1997 |
|---|---|---|
| JP | 5083414 B2 | 11/2012 |
| JP | 2014-236567 A | 12/2014 |
| JP | 5652337 B2 | 1/2015 |
| KR | 10-1998-0053900 A | 9/1998 |

* cited by examiner

*Primary Examiner* — Mussa A Shaawat
*Assistant Examiner* — Michael V Kerrigan
(74) *Attorney, Agent, or Firm* — Morgan, Lewis & Bockius LLP (57) ABSTRACT

A method for controlling a brake of an electric vehicle provided with a smart cruise control system may include detecting, by a driving information detector, a brake demand of a driver when braking control due to a smart cruise controller is performed, stopping, by a vehicle controller, the braking control due to the smart cruise controller and maintaining a braking amount caused by the smart cruise controller when the brake demand of the driver is detected, determining, by the vehicle controller, a demand braking amount according to the brake demand of the driver, and performing, by the vehicle controller, braking control by using the maintained braking amount caused by the smart cruise controller and the demand braking amount.

6 Claims, 8 Drawing Sheets

SYSTEM AND METHOD FOR CONTROLLING BRAKING OF ELECTRIC VEHICLE

CROSS-REFERENCE TO RELATED APPLICATION

The present application claims priority to Korean Patent Application No. 10-2015-0026712 filed Feb. 25, 2015, the entire contents of which is incorporated herein for all purposes by this reference.

BACKGROUND OF THE INVENTION

Field of the Invention

The present invention relates to a system and a method for controlling a brake of an electric vehicle. More particularly, the present invention relates to a system and a method for controlling a brake of an electric vehicle including a smart cruise control system that prevent a loss of braking force caused by the smart cruise control system.

Description of Related Art

Generally, environmentally friendly vehicles such as an electric vehicle, a fuel cell vehicle, and a hybrid electric vehicle are operated by a driving motor which generates torque by electrical energy.

The electric vehicle only uses power of the driving motor operated by power of a battery, and on the contrary, the hybrid electric vehicle uses power of an internal combustion engine and power of the driving motor by efficiently combining them.

The motor of the electric vehicle operates as a generator during braking, and converts kinetic energy to electrical energy. The converted electrical energy is charged in a battery. As such, a system that simultaneously implements reduction of kinetic energy and generation of electrical energy is defined as a regenerative braking system.

Meanwhile, a smart cruise control (SCC) system is gradually being used for a vehicle in recent years. The smart cruise control system can perform acceleration and deceleration and maintain an appropriate vehicular distance from a preceding vehicle by automatically controlling a throttle valve, a brake, and a transmission of the vehicle.

If a driver steps on a brake pedal for braking when the smart cruise control system is operated and braking force caused by the smart cruise control system is generated, the smart cruise control system is stopped and additional braking force is generated. At this time, the smart cruise control system of an engine vehicle increases hydraulic pressure to generate braking force, thereby a stroke of the brake pedal is increased. Thus, if the driver steps on the brake pedal for braking, braking force caused by the smart cruise control system is maintained.

However, the smart cruise control system of the electric vehicle generates braking force by regenerative braking for fuel efficiency since the hydraulic pressure braking and the regenerative braking are separately performed in the electric vehicle. Therefore, in the electric vehicle, a position value of the brake pedal is 0% even though braking force caused by the smart cruise control system is generated, such that a loss of braking force may occur compared to the engine vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for controlling a brake of an electric vehicle having advantages of preventing a loss of braking force caused by the smart cruise control system.

According to various aspects of the present invention, a method for controlling a brake of an electric vehicle provided with a smart cruise control system may include detecting, by a driving information detector, a brake demand of a driver when braking control due to a smart cruise controller is performed, stopping, by a vehicle controller, the braking control due to the smart cruise controller and maintaining a braking amount caused by the smart cruise controller when the brake demand of the driver is detected, determining, by the vehicle controller, a demand braking amount according to the brake demand of the driver, and performing, by the vehicle controller, braking control by using the maintained braking amount caused by the smart cruise controller and the demand braking amount.

The detecting the brake demand of the driver may include comparing a position value of a brake pedal with a predetermined value and determining that the brake demand of the driver is generated when the position value of the brake pedal is greater than the predetermined value.

According to various aspects of the present invention, a method for controlling a brake of an electric vehicle provided with a smart cruise control system may include detecting, by a driving information detector, a brake demand of a driver when braking control due to a smart cruise controller is performed, determining, by a vehicle controller, a demand braking amount of the driver according to a position value of a brake pedal when the brake demand of the driver is detected, stopping, by the vehicle controller, the braking control due to the smart cruise controller when the demand braking amount is the same as a braking amount caused by the smart cruise controller, and performing, by the vehicle controller, braking control by using the demand braking amount.

According to various aspects of the present invention, a method for controlling a brake of an electric vehicle provided with a smart cruise control system may include detecting, by a driving information detector, a brake demand of a driver when braking control due to a smart cruise controller is performed, stopping, by a vehicle controller, the braking control due to the smart cruise controller and maintaining a braking amount caused by the smart cruise controller when the brake demand of the driver is detected, determining, by the vehicle controller, a demand braking amount according to the brake demand of the driver, releasing, by the vehicle controller, the braking amount caused by the smart cruise controller when the demand braking amount is greater than the braking amount caused by the smart cruise controller, and performing, by the vehicle controller, braking control by using the demand braking amount.

According to various aspects of the present invention, a method for controlling a brake of an electric vehicle provided with a smart cruise control system may include detecting, by a driving information detector, a brake demand of a driver when braking control due to a smart cruise controller is performed, stopping, by a vehicle controller, the braking control due to the smart cruise controller and slowly decreasing a braking amount caused by the smart cruise controller when the brake demand of the driver is detected, determining, by the vehicle controller, a demand braking amount according to the brake demand of the driver, releasing, by the vehicle controller, the braking amount caused by the smart cruise controller when the demand braking amount is greater than the braking amount caused by the smart cruise controller, and performing, by the vehicle controller, braking control by using the demand braking amount.

According to various aspects of the present invention, a system for controlling a brake of an electric vehicle may include a driving information detector configured to detect driving information of the electric vehicle, a smart cruise controller configured to perform braking control through regenerative braking and hydraulic pressure braking depending on a vehicular distance to a preceding vehicle based on a signal from the driving information detector, a brake controller configured to control hydraulic pressure supplied to a brake cylinder of a driving wheel according to a braking amount of hydraulic pressure based on signals from the driving information detector and the smart cruise controller, and a vehicle controller configured to stop braking control due to the smart cruise controller when a brake demand of a driver is detected during the braking control due to the smart cruise controller performing, adjust a braking amount caused by the smart cruise controller, and perform braking control of the electric vehicle by determining a demand braking amount according to the brake demand of the driver.

The vehicle controller may be configured to maintain the braking amount caused by the smart cruise controller and perform the braking control by adding the braking amount caused by the smart cruise controller and the demand braking amount.

The vehicle controller may be configured to maintain the braking amount caused by the smart cruise controller, compare the braking amount caused by the smart cruise controller with the demand braking amount of the driver, release the braking amount caused by the smart cruise controller when the demand braking amount is greater than the braking amount caused by the smart cruise controller, and perform the braking control by using the demand braking amount.

The vehicle controller may be configured to slowly decrease the braking amount caused by the smart cruise controller, compare the braking amount caused by the smart cruise controller with the demand braking amount of the driver, and perform the braking control by using the demand braking amount when the demand braking amount is greater than the braking amount caused by the smart cruise controller.

The vehicle controller may be configured to determine that the brake demand of the driver is generated when a position value of a brake pedal is greater than a predetermined value.

According to various aspects of the present invention, a system for controlling a brake of an electric vehicle may include a driving information detector configured to detect driving information of the electric vehicle, a smart cruise controller configured to perform braking control through regenerative braking and hydraulic pressure braking depending on a vehicular distance to the preceding vehicle based on a signal from the driving information detector, a brake controller configured to control hydraulic pressure supplied to a brake cylinder of a driving wheel according to a braking amount of hydraulic pressure based on signals from the driving information detector and the smart cruise controller, and a vehicle controller configured to determine a demand braking amount when a brake demand of a driver is detected during braking control due to the smart cruise controller performing, stop the braking control due to the smart cruise controller when the demand braking amount is the same as a braking amount caused by the smart cruise controller, and perform braking control of the electric vehicle by using the demand braking amount.

As described above, according to various embodiments of the present invention, a loss of braking force caused by the smart cruise control system can be prevented so that the sense of braking can be improved.

In addition, a time point of stopping braking control of the smart cruise control system and a time point of releasing a braking amount caused by the smart cruise control system are separated such that braking stability can be secured.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Figure 1:
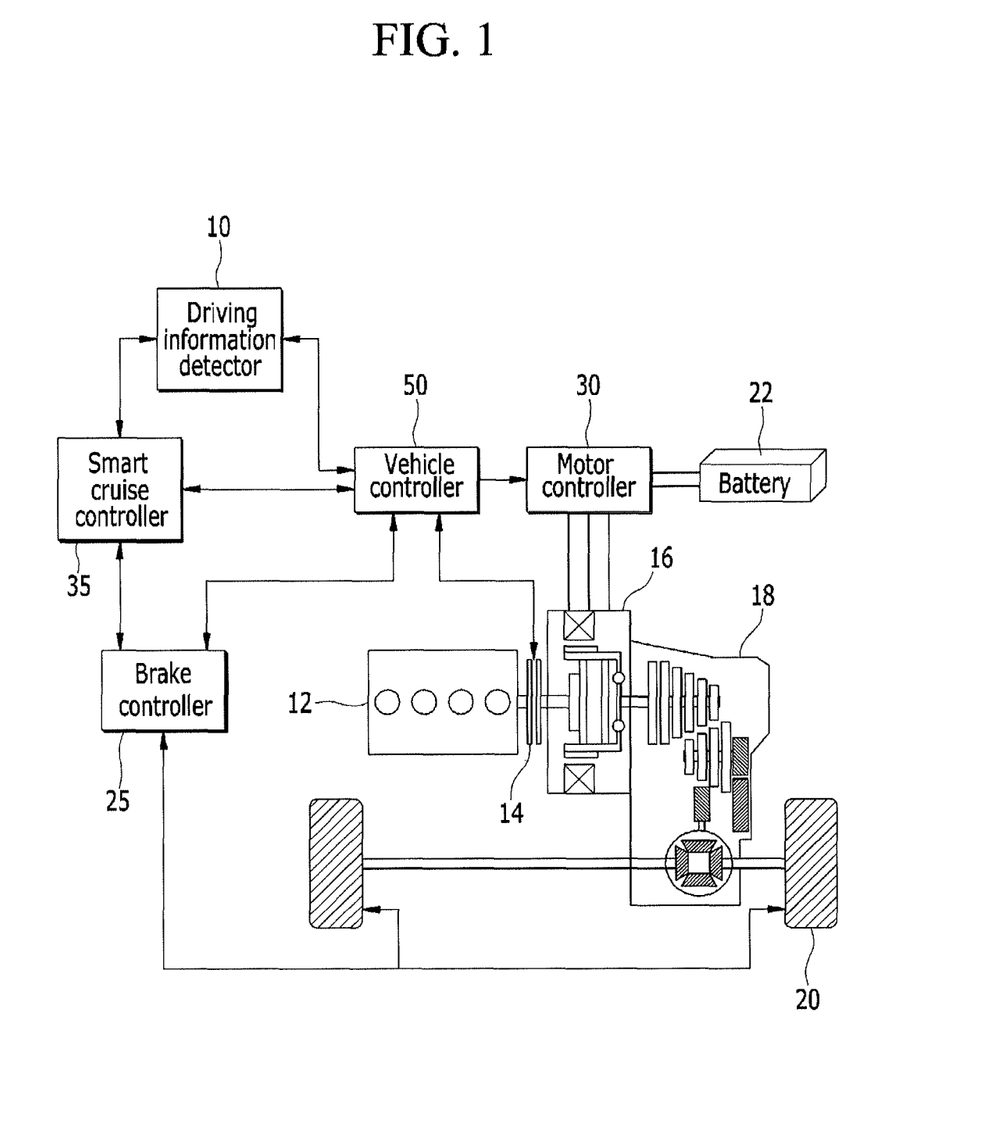
FIG. 1 is a block diagram illustrating an exemplary system for controlling a brake of an electric vehicle according to the present invention.

FIG. 1 is a block diagram illustrating a system for controlling a brake of an electric vehicle according to various embodiments of the present invention.

As shown in FIG. 1, a system for controlling a brake of an electric vehicle according to various embodiments of the present invention includes a driving information detector 10, a motor 16, a transmission 18, a driving wheel 20, a battery 22, a brake controller 25, a motor controller 30, a smart cruise control controller 35, and a vehicle controller 50.

The electric vehicle according to various embodiments of the present invention may further include an engine 12 and an engine clutch 14 in some cases. In this case, the electric vehicle may provide a driving mode in which the engine 12 and the motor 16 separately or simultaneously operate as a power source. For this purpose, the engine clutch 14 is disposed between the engine 12 and the motor 16 to selectively connect the engine 12 and the motor 16 and transmit power to the wheel 20.

The driving information detector 10 detects a running state of the electric vehicle and a brake demand of a driver, and transmits a corresponding signal to the vehicle controller 50.

The driving information detector 10 may include at least one of an engine speed sensor detecting an engine speed, a motor speed sensor detecting a motor speed, a vehicle speed sensor detecting a speed of the vehicle, an accelerator pedal position sensor detecting a position value of an accelerator pedal, and a brake pedal position sensor detecting a position value of a brake pedal.

The motor 16 is operated by a 3-phase AC voltage according to a control signal applied from the motor controller 30 and generates a torque. The motor 16 is operated as a generator in coast down driving to supply a voltage to the battery 22.

The motor controller 30 controls driving and torque of the motor 16 according to the vehicle controller 50 and stores electricity that is generated in the motor 16 at the battery 22 upon regenerative braking.

For these purposes, the motor controller 30 is provided with one or more microprocessors, and the one or more microprocessors may be executed by a predetermined program for performing a method of controlling driving and torque of the motor 16.

The sum of an output torque of the motor 16 and an output torque of the engine 12 that is determined according to coupling and release of the engine clutch 14 is supplied as an input torque, and a transmission level is selected according to a vehicle speed and a driving condition and thus the transmission 18 outputs a driving torque to the driving wheel 20 to maintain driving.

The transmission 18 adjusts a shift ratio according to the control of the vehicle controller 50, and distributes an output torque that is added and applied through the engine clutch 14 according to a driving mode with a shift ratio and transfers the output torque to the driving wheel 20, thereby enabling the vehicle to drive.

The battery 22 is formed with a plurality of unit cells, and a high voltage for providing a driving voltage to the motor 16 is stored in the battery 22. The battery 22 supplies a driving voltage to the motor 16 in an EV mode or an HEV mode, and is charged with a voltage that is generated in the motor 16 upon regenerative braking.

When a commercial power source is plug-in connected, the battery 22 may be charged by a voltage and a current that are supplied through a charge device.

The brake controller 25 calculates a braking amount of hydraulic pressure of a pedal stroke and hydraulic pressure of a master cylinder when a driver requests a brake. Then, the brake controller 25 controls hydraulic pressure braking supplied to a brake cylinder of each wheel 20 according to the braking amount of hydraulic pressure.

For these purposes, the brake controller 25 is provided with one or more microprocessors, and the one or more microprocessor may be executed by a predetermined program for performing a method of controlling hydraulic pressure braking.

The smart cruise control controller 35 detects a vehicular distance and relative speed with respect to a forward vehicle based on the signal from the driving information detector 10, and transmits a signal of acceleration and deceleration to the vehicle controller 50.

In addition, when a brake demand is requested for a vehicular distance control, the smart cruise control controller 35 may transmit a braking amount to the brake controller 25 for a hydraulic pressure braking control and the vehicle controller 50 for a regenerative braking control.

For these purposes, the smart cruise control controller 35 is provided with one or more microprocessors, and the one or more microprocessors may be executed by a predetermined program for performing a method of controlling a vehicular distance.

The vehicle controller 50 is an uppermost controller and integrally controls subordinate controllers that are connected to a network, and collects and analyzes information of each subordinate controller to control all operations of the vehicle.

The vehicle controller 50 stops braking control due to the smart cruise controller 35 when a brake demand of a driver is detected during the braking control due to the smart cruise controller 35 performing, adjusts a braking amount caused by the smart cruise controller 35, and performs braking control of the electric vehicle by determining a demand braking amount according to the brake demand of the driver.

For these purposes, the vehicle controller 50 is provided with one or more microprocessors, and the one or more microprocessors may be executed by a predetermined program for performing a method for controlling braking of the electric vehicle according to various embodiments of the present invention.

Hereinafter, a method for calculating a regenerative braking amount of an electric vehicle according to various embodiments of the present invention will be described in detail with reference to FIG. 2 to FIG. 8.

Figure 2:
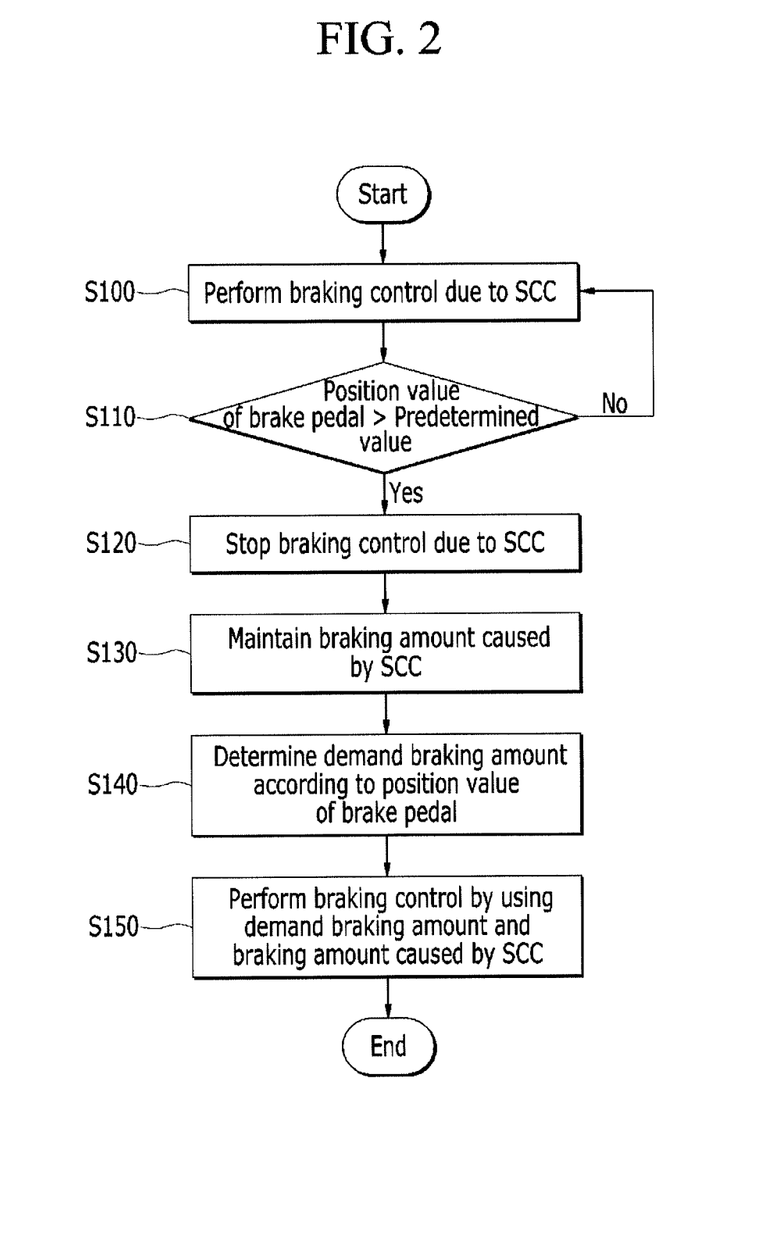
FIG. 2 is a flowchart illustrating an exemplary method for controlling a brake of an electric vehicle according to the present invention.
Figure 3:
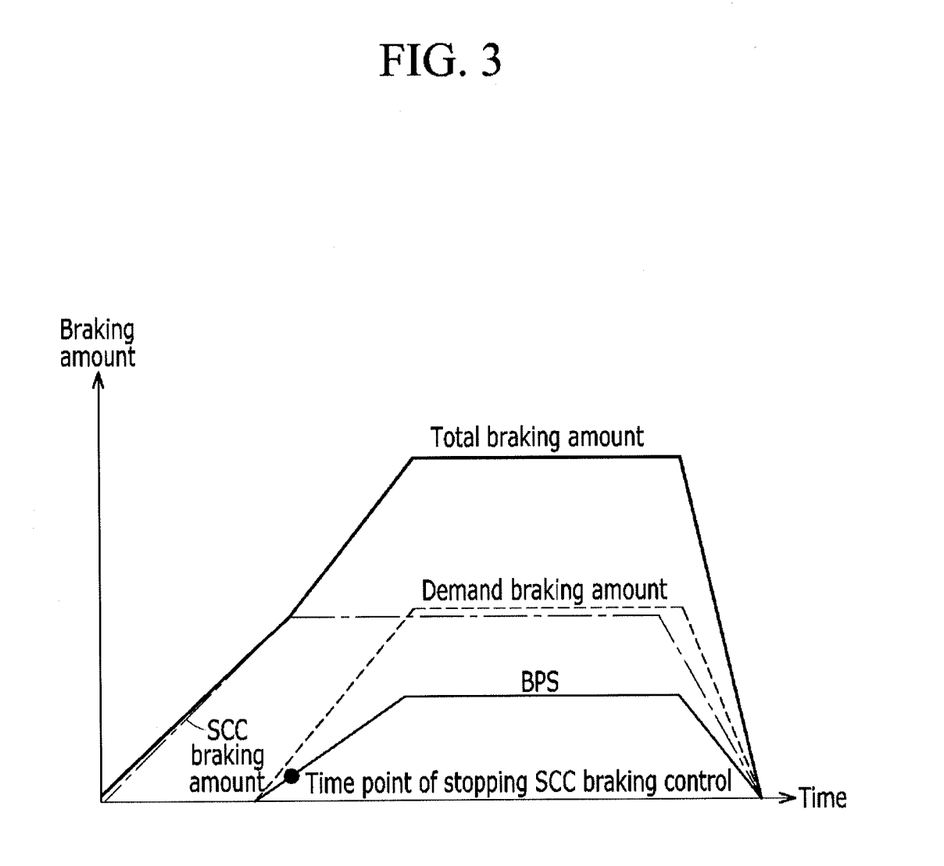
FIG. 3 is a graph showing a braking amount to which an exemplary method for controlling a brake of an electric vehicle according to the present invention is applied.

FIG. 2 is a flowchart illustrating a method for controlling a brake of an electric vehicle according to various embodiments of the present invention, and FIG. 3 is a graph showing a braking amount to which a method for controlling a brake of an electric vehicle according to various embodiments of the present invention is applied.

As shown in FIG. 2, a method for controlling a brake of an electric vehicle according to various embodiments of the present invention begins with performing braking control due to the smart cruise controller 35 at step S100.

When the braking control due to the smart cruise controller 35 is performed at the step S100, the vehicle controller 50 compares a position value of a brake pedal with a predetermined value for detecting a brake demand of a driver at step S110.

When the position value of the brake pedal is greater than the predetermined value at the step S110, the vehicle controller 50 determines that the brake demand of the driver is generated and stops the braking control due to the smart cruise controller 35 at step S120.

Even though the vehicle controller 50 stops the braking control due to the smart cruise controller 35 at the step S120, the vehicle controller 50 maintains a braking amount caused by the smart cruise controller 35 at step S130.

After that, the vehicle controller 50 determines a demand braking amount according to the position value of the brake pedal at step S140, and performs braking control of the electric vehicle by using the determined demand braking amount and the maintained braking amount caused by the smart cruise controller 35 at step S150.

As shown in FIG. 3, the vehicle controller 50 maintains the braking amount caused by the smart cruise controller 35 even though the vehicle controller 50 stops the braking control due to the smart cruise controller 35 when the brake demand of the driver is generated through the brake pedal.

Therefore, a total braking amount necessary to brake the electric vehicle may be satisfied by adding the demand braking amount and the maintained braking amount caused by the smart cruise controller 35.

As described above, according to various embodiments of the present invention, a loss of braking force caused by the smart cruise control system can be prevented even though the braking control due to the smart cruise controller 35 is stopped.

Figure 4:
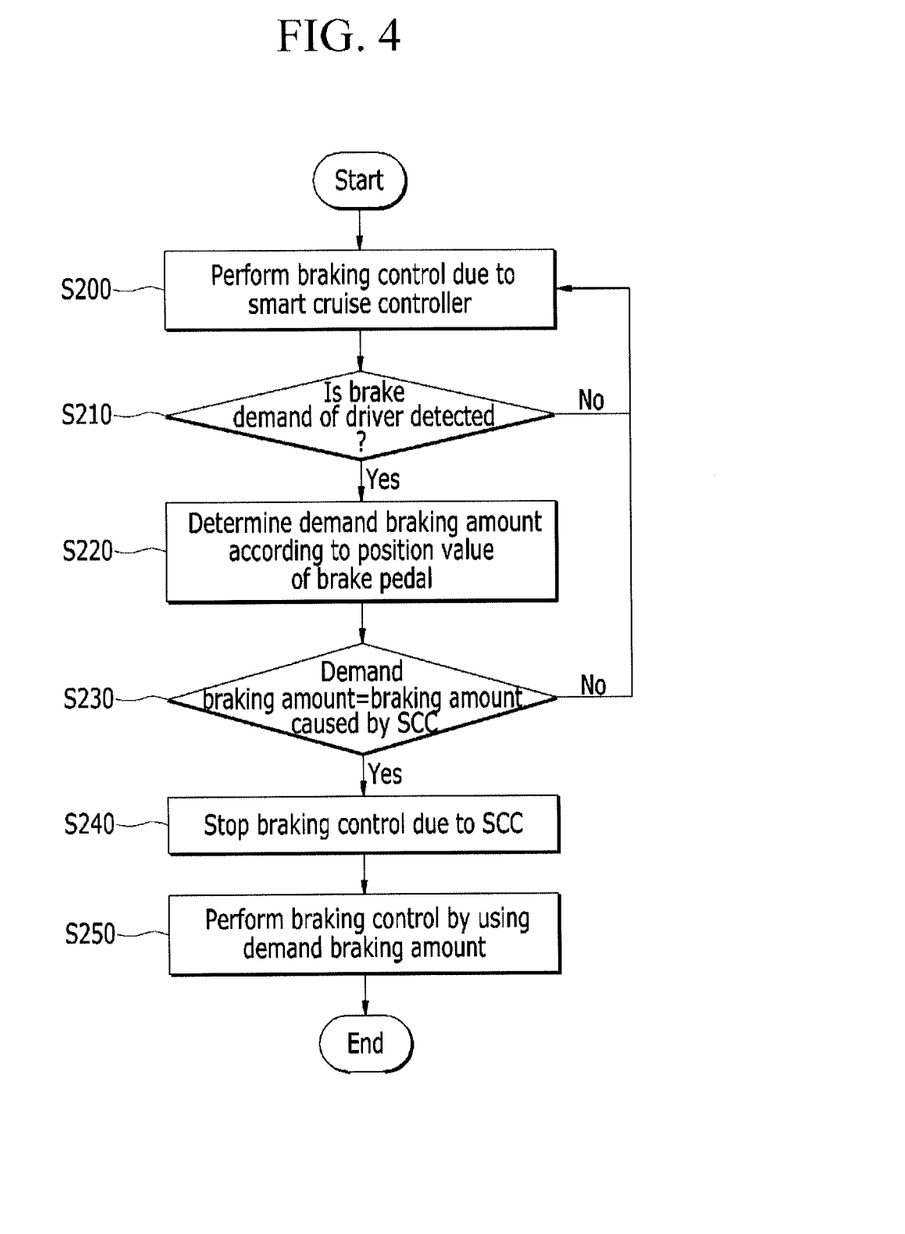
FIG. 4 is a flowchart illustrating an exemplary method for controlling a brake of an electric vehicle according to the present invention.
Figure 5:
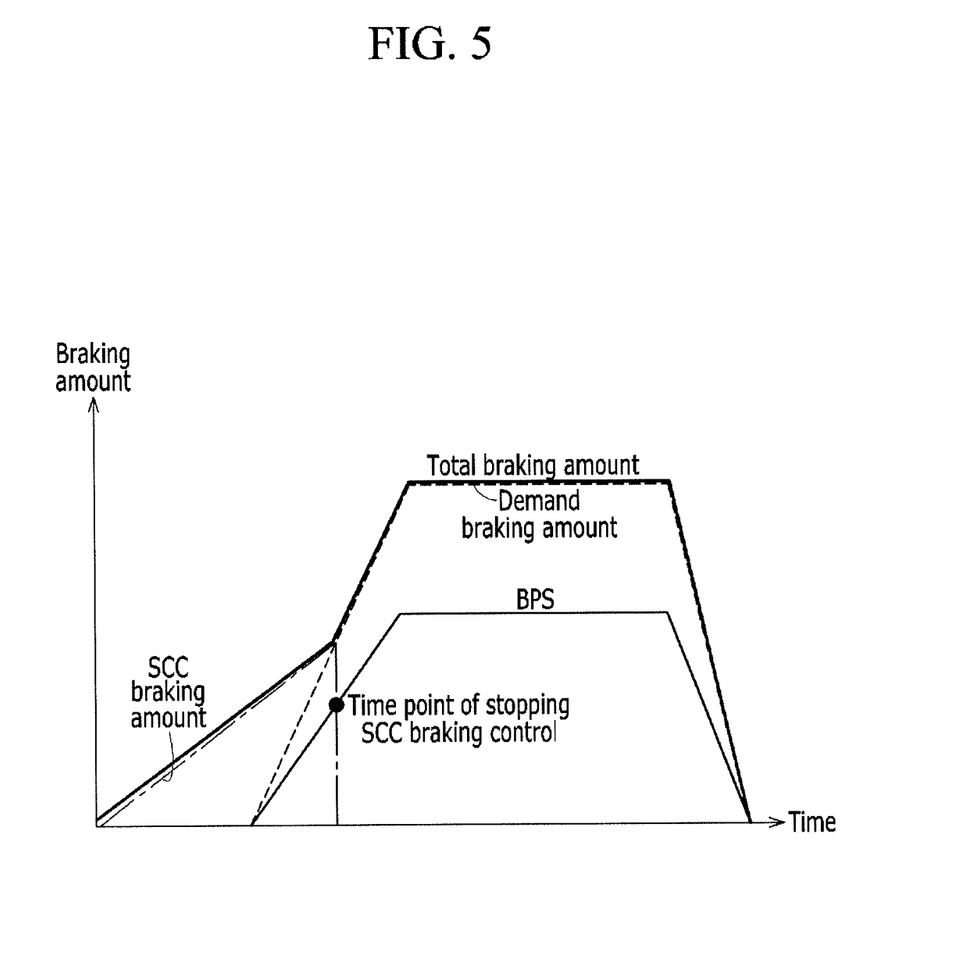
FIG. 5 is a graph showing a braking amount to which the exemplary method for controlling a brake of an electric vehicle of FIG. 4 according to the present invention, is applied.

FIG. 4 is a flowchart illustrating a method for controlling a brake of an electric vehicle according to various embodiments of the present invention, and FIG. 5 is a graph showing a braking amount to which a method for controlling a brake of an electric vehicle according to various embodiments of the present invention is applied.

As shown in FIG. 4, a method for controlling a brake of an electric vehicle according to various embodiments of the present invention begins with performing braking control due to the smart cruise controller 35 at step S200.

When the braking control due to the smart cruise controller 35 is performed at the step S200, the vehicle controller 50 detects a brake demand of a driver at step S210. When the brake demand of the driver is detected, the vehicle controller 50 determines a demand braking amount of the driver according to a position value of a brake pedal at step S220.

After that, the vehicle controller 50 compares the demand braking amount with the braking amount caused by the smart cruise controller 35 at step S230. When the demand braking amount is same as the braking amount caused by the smart cruise controller 35 at the step S230, the vehicle controller 50 stops the braking control due to the smart cruise controller 35 at step S240.

As shown in FIG. 5, the braking control due to the smart cruise controller 35 is performed before the demand braking amount is the same as the braking amount caused by the smart cruise controller 35. That is, a time point of stopping the braking control due to the smart cruise controller 35 may be delayed.

In this case, the demand braking amount may follow the total braking amount even though the braking control due to the smart cruise controller 35 is stopped. Thus, the vehicle controller 50 performs the braking control by using the demand braking amount at step S250.

As described above, according to various embodiments of the present invention, a change of the demand braking amount after stopping the braking control due to the smart cruise system may be the same as a braking amount when the smart cruise system is not operated. Accordingly, a loss of braking force can be prevented.

Figure 6:
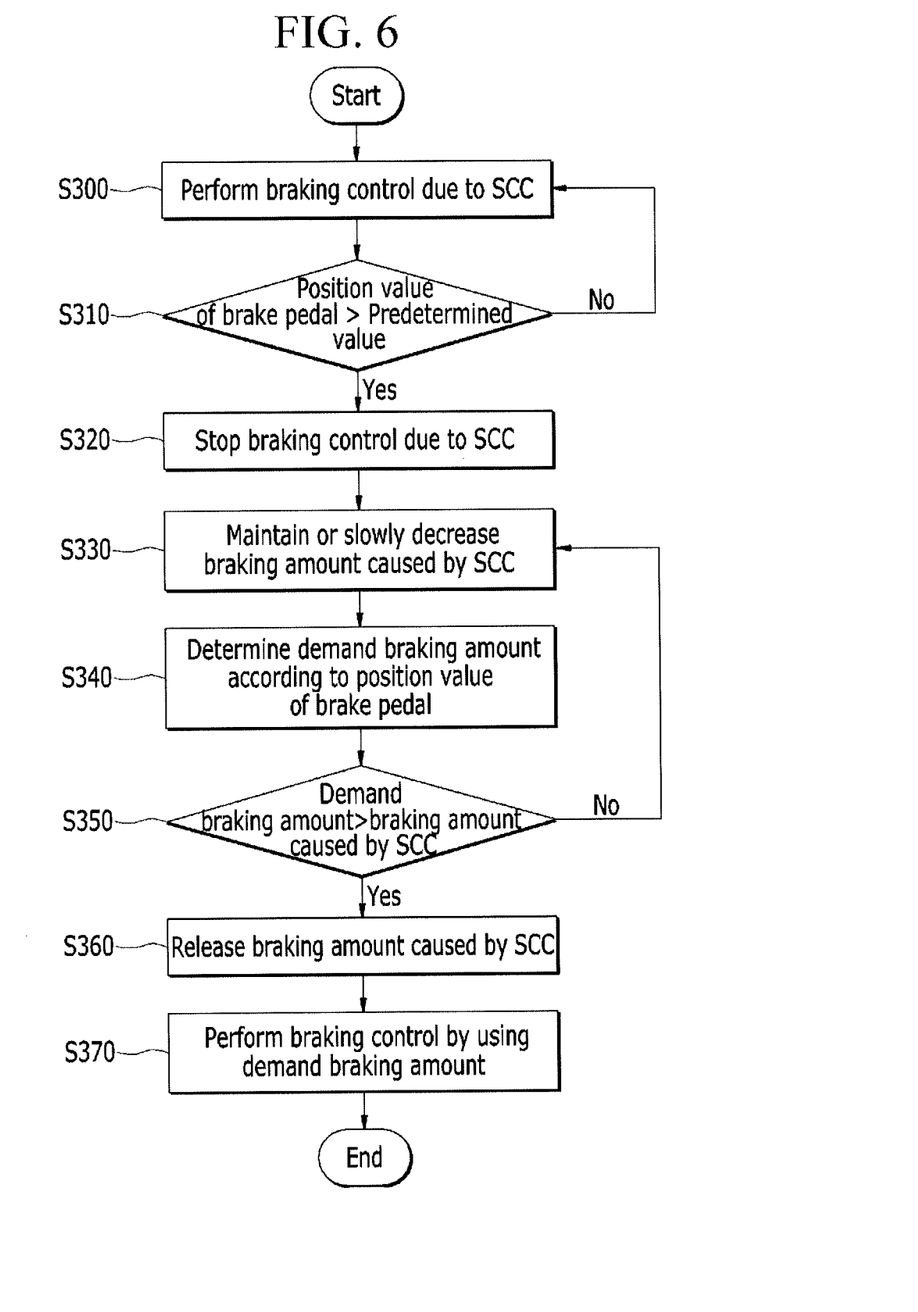
FIG. 6 is a flowchart illustrating an exemplary method for controlling a brake of an electric vehicle according to the present invention.
Figure 7:
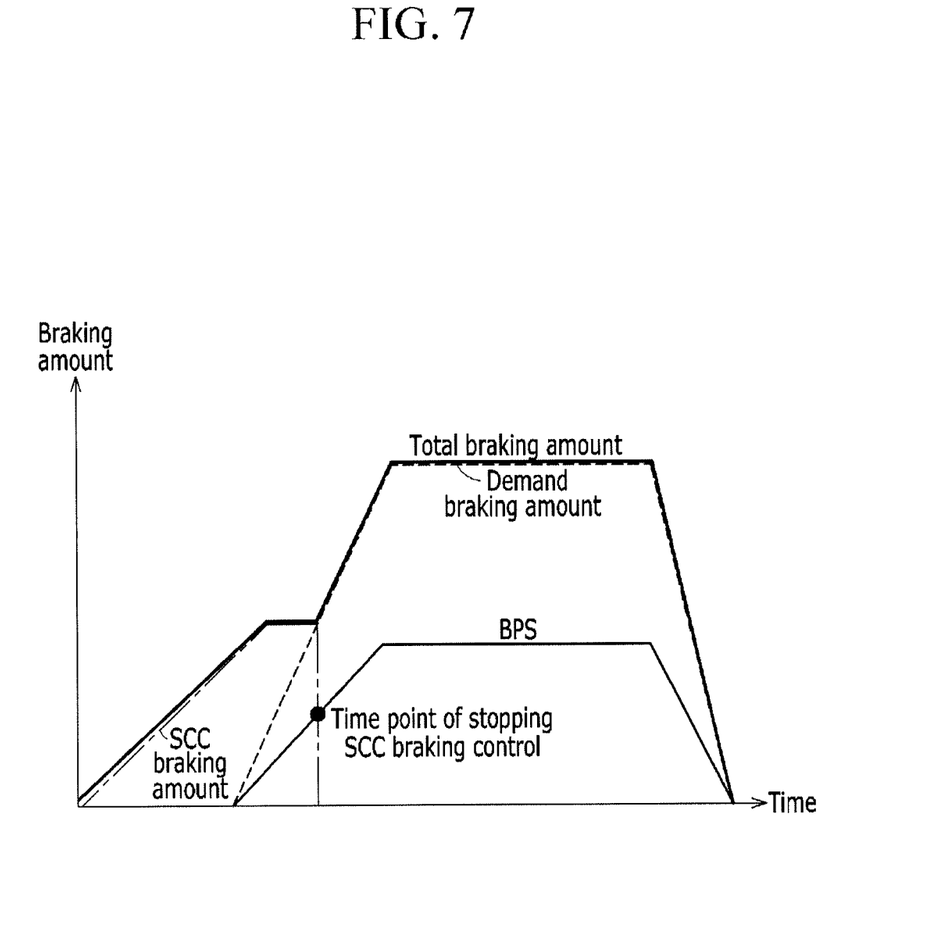
FIG. 7 is a graph showing a braking amount to which the exemplary method for controlling a brake of an electric vehicle of FIG. 6 according to the present invention, is applied.
Figure 8:
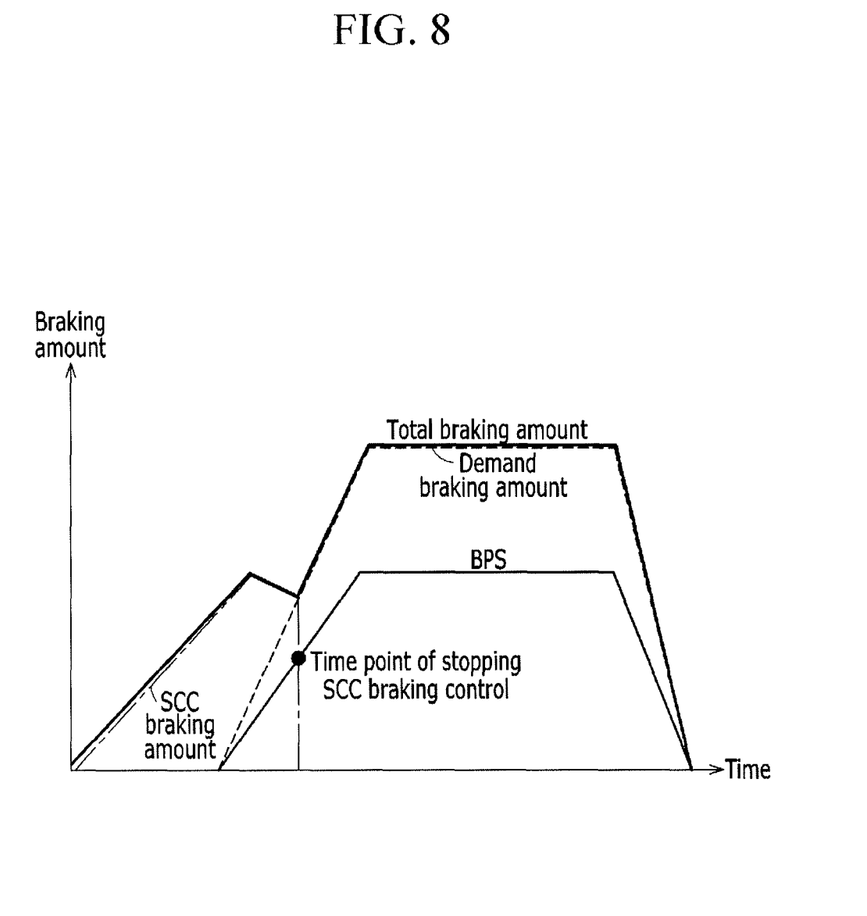
FIG. 8 is a graph showing a braking amount to which the exemplary method for controlling a brake of an electric vehicle of FIG. 6 according to the present invention, is applied.

FIG. 6 is a flowchart illustrating a method for controlling a brake of an electric vehicle according to various embodiments of the present invention. In addition, FIG. 7 is a graph showing a braking amount to which a method for controlling a brake of an electric vehicle according to the various embodiments of FIG. 6 is applied, and FIG. 8 is a graph showing a braking amount to which a method for controlling a brake of an electric vehicle according to the various embodiments of FIG. 6 is applied.

As shown in FIG. 6, a method for controlling a brake of an electric vehicle according to the various embodiments of FIG. 6 begins with performing braking control due to the smart cruise controller 35 at step S300.

When the braking control due to the smart cruise controller 35 is performed at the step S300, the vehicle controller 50 compares a position value of a brake pedal with a predetermined value for detecting a brake demand of a driver at step S310.

When the position value of the brake pedal is greater than the predetermined value at the step S310, the vehicle controller 50 determines that the brake demand of the driver is generated and stops the braking control due to the smart cruise controller 35 at step S320.

Even though the vehicle controller 50 stops the braking control due to the smart cruise controller 35 at the step S320, the vehicle controller 50 maintains a braking amount caused by the smart cruise controller 35 at step S330.

After that, the vehicle controller 50 determines a demand braking amount according to the position value of the brake pedal at step S340, and compares the determined demand braking amount with the braking amount caused by the smart cruise controller 35 at step S350.

When the demand braking amount is greater than the braking amount caused by the smart cruise controller 35 at the step S350, the vehicle controller 50 releases the braking amount caused by the smart cruise controller 35 at step S360.

That is, as shown in FIG. 7, the vehicle controller 50 maintains the demand braking amount which is increased until the demand braking amount is greater than the braking amount caused by the smart cruise controller 35.

When the demand braking amount is greater than the braking amount caused by the smart cruise controller 35, the demand braking amount follows the total braking amount. Thus, vehicle controller 50 performs the braking control by using the demand braking amount at step S370.

As described above, according to various embodiments of FIG. 7, a time point of stopping braking control of the smart cruise control system and a time point of releasing a braking amount caused by the smart cruise control system are separated such that braking stability can be secured.

Various embodiments of FIG. 6 as illustrated in FIG. 7 and FIG. 8 are performed with the same process, however there is a difference at the step S330. That is, in the various embodiments of FIG. 8, the vehicle controller 50 slowly decreases the braking amount caused by the smart cruise controller 35 at step S330.

As shown in FIG. 8, the vehicle controller 50 slowly decreases the braking amount caused by the smart cruise controller 35 according to a predetermined slope.

As described above, according to various embodiments of FIG. 8, a total braking amount is decreased depending on the braking amount caused by the smart cruise controller 35, thereby a loss of braking force can be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a brake of an electric vehicle provided with a smart cruise control system, the method comprising:

detecting, by a driving information detector, a brake demand of a driver when braking control due to a smart cruise controller is performed;

stopping, by a vehicle controller, the braking control due to the smart cruise controller and gradually decreasing a braking amount that was caused by the smart cruise controller at a time when the brake demand of the driver is detected;

determining, by the vehicle controller, a demand braking amount according to the brake demand of the driver;

releasing, by the vehicle controller, the braking amount caused by the smart cruise controller when the demand braking amount is greater than the braking amount caused by the smart cruise controller; and performing, by the vehicle controller, braking control by adding using the demand braking amount.

2. The method of claim 1, wherein the detecting the brake demand of the driver comprises:

comparing a position value of a brake pedal with a predetermined value; and determining that the brake demand of the driver is present when the position value of the brake pedal is greater than the predetermined value.

3. The method of claim 1, wherein the braking amount that was caused by the smart cruise controller is gradually decreased with a predetermined slope.

4. A system for controlling a brake of an electric vehicle, comprising:

a driving information detector configured to detect driving information of the electric vehicle;

a smart cruise controller configured to perform braking control through regenerative braking and hydraulic pressure braking depending on a distance from the electric vehicle to a vehicle immediately preceding the electric vehicle based on a signal from the driving information detector;

a brake controller configured to control hydraulic pressure supplied to a brake cylinder of a driving wheel of the electric vehicle according to a braking amount of hydraulic pressure based on signals from the driving information detector and the smart cruise controller; and a vehicle controller configured to stop braking control due to the smart cruise controller at a time when a brake demand of a driver is detected during the braking control due to the smart cruise controller performing, adjust a braking amount that was caused by the smart cruise controller, and perform braking control of the electric vehicle by determining a demand braking amount according to the brake demand of the driver, wherein the vehicle controller is configured to gradually decrease the braking amount caused by the smart cruise controller for adjusting the braking amount, compare the braking amount caused by the smart cruise controller with the demand braking amount of the driver, and perform the braking control by using the demand braking amount when the demand braking amount is greater than the braking amount caused by the smart cruise controller.

5. The system of claim 4, wherein the vehicle controller is configured to determine that the brake demand of the driver is present when a position value of a brake pedal is greater than a predetermined value.

6. The method of claim 4, wherein the vehicle controller is configured to gradually decrease the braking amount caused by the smart cruise controller with a predetermined slope.

* * * * *